United States Patent

Hobbs et al.

[15] 3,676,304
[45] July 11, 1972

[54] CONTROL OF FRACTIONATION COLUMN REBOILER

[72] Inventors: James W. Hobbs, Bartlesville, Okla.; George W. Long, Sweeny, Tex.

[73] Assignee: Phillips Petroleum Company

[22] Filed: July 8, 1970

[21] Appl. No.: 53,107

[52] U.S. Cl..................................202/160, 202/206, 203/1, 203/2, 203/3, 203/DIG. 18, 62/37, 235/151.12, 236/24.5, 236/32
[51] Int. Cl..........................................................B01d 3/42
[58] Field of Search ...............203/1, 2, 3; 202/160, 206; 196/132; 62/21, 37; 235/151.12; 236/24.5, 32

[56] References Cited

UNITED STATES PATENTS

| | | | |
|---|---|---|---|
| 3,336,205 | 8/1967 | Rijnsdorp et al. | 203/DIG. 18 |
| 3,415,720 | 10/1968 | Rijnsdorp et al. | 203/DIG. 18 |
| 2,754,053 | 7/1956 | Howe et al. | 203/DIG. 18 |
| 3,151,044 | 9/1964 | Oglesby, Jr. | 203/2 |
| 3,177,125 | 4/1965 | Berger | 203/2 |
| 3,021,263 | 2/1962 | Berger et al. | 203/3 |
| 3,208,230 | 9/1965 | Fournaux | 196/132 |

*Primary Examiner*—Wilbur L. Bascomb, Jr.
*Attorney*—Young and Quigg

[57] ABSTRACT

The flow of heat exchange fluid through the reboiler of a fractionation column is controlled in response to a computation of the heat actually supplied by the fluid. The set point of the flow controller is established from a measurement of the separation made by the column or the liquid level in the lower region of the column.

3 Claims, 2 Drawing Figures

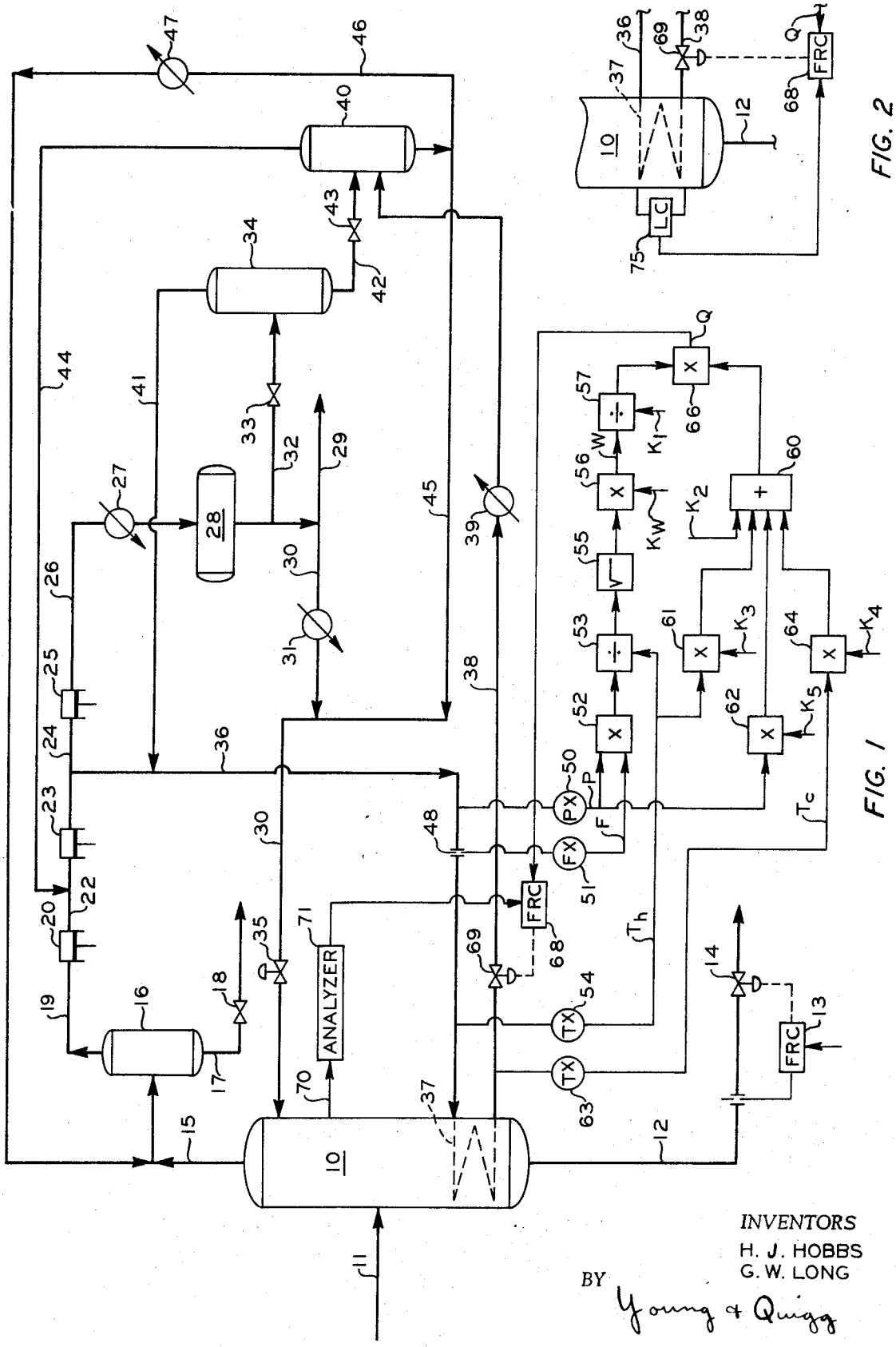

CONTROL OF FRACTIONATION COLUMN REBOILER

Various types of automatic control devices have been developed in recent years for use on fractionation columns. One common procedure is to control the flow of heating medium to the reboiler by a conventional flow controller, the set point of which is regulated by a measurement of the liquid level in the lower region of the column. The amount of heat supplied to the column is thus adjusted to maintain a desired liquid level. While this type of control is quite effective in many operations, certain problems may be encountered if the heat content of the reboiler heat exchange fluid is not constant. This can occur when a gaseous material is employed as the heat exchange medium, particularly when such gaseous material is obtained from more than one source.

In accordance with this invention, an improved control system is provided for regulating the flow of heat exchange medium to the reboiler of a fractionation column. This control is based on a computation of the actual heat transferred to the reboiler by the heat exchange medium. A first computation is made of the mass flow rate of the heating medium. A second computation is made of the heat actually supplied to the reboiler. In response to this second computation, the flow of heat exchange medium is regulated so that a predetermined amount of heat is supplied to the column. The set point of a controller employed to regulate the flow of heating medium is adjusted in response to a measurement of the composition of the materials being separated at a predetermined region of the column or in response to the liquid level in the lower region of the column.

In the accompanying drawing

FIG. 1 is a schematic representation of a fractionation system having an embodiment of the control apparatus of this invention incorporated therein.

FIG. 2 illustrates a second embodiment of the control apparatus.

As illustrated in FIG. 1 of the drawing, a multi-component feed mixture to be separated is introduced into a fractionation column 10 through an inlet conduit 11. While this invention is applicable to many fractionation systems, the invention will be described with respect to an ethylene fractionation column wherein the feed mixture contains primarily ethylene and ethane, together with small amounts of higher and lower boiling constituents. A bottom stream containing ethane and any high boiling constituents is withdrawn through a conduit 12. The rate of flow through conduit 12 is maintained at a predetermined rate by a flow controller 13 which adjusts a valve 14. A vaporous overhead stream containing ethylene and any lighter boiling constituents is withdrawn from the upper region of column 10 through a conduit 15 which communicates with a knock-out drum 16. A conduit 17, which has a normally closed valve 18 therein, communicates with the bottom of drum 16 for the removal of accumulated liquid as required.

A vapor stream is withdrawn from the top of drum 16 and passed by a conduit 19 to the inlet of first stage compressor 20. The outlet of compressor 20 is connected by a conduit 22 to the inlet of a second stage compressor 23. The outlet of compressor 23 is connected by a conduit 24 to the inlet of a third stage compressor 25. The outlet of compressor 25 is connected by a conduit 26, which has a condenser 27 therein, to an accumulator 28. Condenser 27 serves to condense substantially all of the compressed vapor from compressor 25. A first portion of the resulting condensate is removed from accumulator 28 through an overhead product conduit 29. A second portion is passed through a conduit 30, which has a cooler 31 therein, to the upper region of column 10 as reflux. A control valve 35 is disposed in conduit 30. This valve can be adjusted by an internal reflux computer, not shown. A third portion of the condensate from accumulator 28 is passed through a conduit 32, which has an expansion valve 33 therein, to a high pressure flash tank 34.

A conduit 36 extends between the outlet of second stage compressor 23 and a reboiler 37. A conduit 38, which has a heat exchanger 39 therein, extends from reboiler 37 to a low pressure flash tank 40. A conduit 41 extends between the top of flash tank 34 and conduit 36. A conduit 42, which has an expansion valve 43 therein, extends from the bottom of flash tank 34 to flash tank 40. Vapors are removed from the top of flash tank 40 and passed through a conduit 44 to the inlet of second stage compressor 23. A first portion of the condensate in tank 40 is directed through a conduit 45 which communicates with reflux conduit 30. A second portion of the condensate in tank 40 is directed through a conduit 46, which has a heat exchanger 47 therein, to the inlet of knock-out drum 16.

In accordance with this invention, the flow of heat exchange medium through reboiler 37 is controlled so that a predetermined amount of heat is supplied to the column at all times. This control is based on a computation of the heat supplied by the heat exchange medium. The quantity of heat so supplied can be calculated by multiplying the mass flow rate by the heat lost per unit mass of the fluid passing through the reboiler. For the system illustrated, this heat is calculated from the following equations:

$$W = K_w \sqrt{\frac{PF}{T_h}}$$

where $W$ is the mass flow of heating medium, $K_w$ is the orifice constant of an orifice meter 48 in conduit 36, $P$ is the pressure of the fluid in conduit 36, $F$ is the output signal from the flow transducer 51 associated orifice meter 48 and $T_h$ is the temperature of the fluid in conduit 36, and $$Q = W/K_1 [K_2 + K_3 T_h - K_4 T_c - K_5 P] \quad (2)$$

where $Q$ is the heat supplied to the reboiler, $T_c$ is the temperature of the fluid in conduit 38, and $K_1$, $K_2$, $K_3$, $K_4$ and $K_5$ are constants. These constants compensate for changes in heat loss per unit mass at different temperatures and pressures. If a liquid is employed as the heating medium, the P compensation is not needed, and the equation for heat supplied to the reboiler reduces to $Q = W c_p (T_h - T_c)$, where $cp$ is the specific heat of the liquid.

In order to solve equation (1), a pressure transducer 50 and flow transducer 51 are associated with conduit 36 to provide respective output signals P and F which represent the pressure of the heat exchange medium and the square of the volumetric rate of flow. These two signals are applied to the respective inputs of a multiplier 52. The resulting product is applied as the numerator to a divider 53. A transducer 54 establishes an output signal $T_h$ which is representative of the temperature of the heat exchange medium introduced into reboiler 37. This signal is applied as the denominator to divider 53. The resulting quotient is transmitted through a square root device 55 to the first input of a multiplier 56. A constant signal $K_w$ is applied to the second input of multiplier 56. The resulting product, which is representative of W, is applied as the numerator to a divider 57. A constant signal $K_1$ is applied as the denominator to divider 57.

A reference signal $K_2$ is applied to the first input of a summing device 60. Signal $T_h$ and a reference signal $K_3$ are applied to the respective inputs of a multiplier 61. The resulting product is applied to the second input of summing device 60. Signal P and a constant signal $K_5$ are applied to the respective inputs of a multiplier 62. The resulting product is applied to the third input of summing device 60. A transducer 63 is provided to establish an output signal $T_c$ which is representative of the temperature of the heat exchange medium leaving reboiler 37. This signal and a constant signal $K_4$ are applied to the respective inputs of a multiplier 64. The resulting product is applied to the fourth input of summing device 60. Summing device 60 actually sums the first two signals and subtracts the third and fourth signals therefrom.

The output signals from divider 57 and summing device 60 are applied to the respective inputs of a multiplier 66. The product, which is representative of Q, is applied as the input signal to a flow controller 68. A fluid sample is withdrawn from an upper region of column 10 and passed through a conduit 70 to an analyzer 71. Analyzer 71, which can be a chromatographic analyzer, establishes an output signal which is representative of the concentration of ethane, the kettle product, in the measured sample. In order to maintain the concentration of ethane below a preselected level in the column overhead, the set point of flow controller 68 is adjusted in accordance with this signal. The output signal from flow controller 68 regulates a valve 69 in conduit 38 to adjust the rate of flow of heating medium through reboiler 37. The output signal from analyzer 71 thus establishes the rate of flow of heating medium required to maintain the desired separation. If the heat content of the heat exchange medium varies, valve 69 is adjusted by controller 68 as required.

Since the goal of the fractionation step is to obtain a high purity ethylene overhead product, the signal from analyzer 71 is employed to limit the ethane concentration. The sample point of analyzer 71 should be above the feed entry point, preferably at a location where the ethane concentration changes rather rapidly with respect to different trays in the column. This sample point can be at the top tray, or even at overhead vapor conduit 15.

In another embodiment of this invention, the set point of controller 68 is adjusted to maintain a predetermined liquid level in the lower region of the column. This can be accomplished by a level controller 75, which is illustrated in FIG. 2. The remainder of the system of FIG. 2 can be the same as shown in FIG. 1.

While this invention has been described in conjunction with presently preferred embodiments, it obviously is not limited thereto.

The computing apparatus can employ analog elements to perform the operations illustrated in FIG. 1. As an alternative, the measured values can be converted to digital signals and applied to a digital computer which is programmed to perform the indicated calculations. A digital-to-analog converter can be utilized to establish an analog control signal to be applied to controller 68.

What is claimed is:

1. A control system to regulate the heat supplied to a reboiler of a fractionation column which is employed to separate a fluid mixture, by a heating fluid circulated through a reboiler of the column, said heating fluid being introduced into said reboiler as a compressed gas, said system comprising:

means to measure the temperature of the compressed gas introduced into the reboiler and establish a first signal representative thereof;

means to measure the temperature of the heating fluid withdrawn from the reboiler and establish a second signal representative thereof;

means to introduce the compressed gas into the reboiler through an orifice meter and establish a third signal representative of the differential pressure across the orifice meter;

means to measure the pressure of the compressed gas introduced into the reboiler and establish a fourth signal representative thereof;

means to multiply said third signal by said fourth signal and establish a fifth signal representative of the product;

means to divide said fifth signal by said first signal and establish a sixth signal representative of the quotient;

means responsive to said sixth signal to establish a seventh signal representative of the square root of said sixth signal;

means to multiply said seventh signal by an eighth signal representative of the orifice constant of the orifice meter and establish a ninth signal representative of the product;

means to divide said ninth signal by a 10th signal representative of a constant and establishes an 11th signal representative of the quotient;

means to multiply said first signal by a 12th signal representative of a constant and establish a 13th signal representative of the product;

means to multiply said second signal by a 14th signal representative of a constant and establish a 15th signal representative of the product;

means to multiply said fourth signal by a 16th signal representative of a constant and establish a 17th signal representative of the product;

means to establish an 18th signal representative of a constant;

means to add said 13th signal to said 18th signal and to subtract said 15th signal and said 17th signal from the resulting sum to establish a 19th signal representative of the difference;

means to multiply said 11signal by said 19th signal and establish a 20th signal representative of the product;

means to analyze the fluid mixture being separated at a preselected region of the column and establish a 21st signal representative of the degree of separation;

means to compare said 20th and 21st signals and establish a 22nd signal representative of any difference therebetween; and means responsive to said 22nd signal to control the rate at which the heating fluid is withdrawn from the reboiler.

2. The control system of claim 1 wherein said means to analyze comprises an analyzer adapted to establish an output signal representative of the concentration of a first constituent of a sample supplied to the analyzer, and means to pass a sample of fluid to said analyzer from a region of the fractionation column above the point at which the fluid mixture to be separated is introduced, said constituent being a constituent of the fluid mixture which is normally removed from the bottom of the column.

3. A control system to regulate the heat supplied to a reboiler of a fractionation column which is employed to separate a fluid mixture, by a heating fluid circulated through a reboiler of the column, said heating fluid being introduced into said reboiler as a compressed gas, said system comprising:

means to measure the temperature of the compressed gas introduced into the reboiler and establish a first signal representative thereof;

means to measure the temperature of the heating fluid withdrawn from the reboiler and establish a second signal representative thereof;

means to introduce the compressed gas into the reboiler through an orifice meter and established a third signal representative of the differential pressure across the orifice meter;

means to measure the pressure of the compressed gas introduced into the reboiler and established a fourth signal representative thereof;

means to multiply said third signal by said fourth signal and establish a fifth signal representative of the product;

means to divide said fifth signal by said first signal and establish a sixth signal representative of the quotient;

means responsive to said sixth signal to establish a seventh signal representative of the square root of said sixth signal;

means to multiply said seventh signal by an eighth signal representative of the orifice constant of the orifice meter and establish a ninth signal representative of the product;

means to divide said ninth signal by a 10th signal representative of a constant and establish an eleventh signal representative of the quotient;

means to multiply said first signal by a 12th signal representative of a constant and establish a 13th signal representative of the product;

means to multiply said second signal by a 14th signal representative of a constant and establish a 15th signal representative of the product;

means to multiply said fourth signal by a sixteenth signal representative of a constant and establish a 17th signal representative of the product;

means to establish an 18th signal representative of a constant;

means to add said 13th signal to 18th signal and to subtract said 15th signal and said seventeenth signal from the resulting sum to establish a 19th signal representative of the difference;

means to multiply and eleventh signal by said 19th signal and establish 20th signal representative of the product;

means to measure the liquid level in the lower region of the fractionation column and establish a 21st signal representative thereof;

means to compare said 20th and 21st signals and establish a 22nd signal representative of any difference therebetween; and means responsive to said 22nd signal to control the rate at which the heating fluid is withdrawn from the reboiler.

* * * * *

UNITED STATES PATENT OFFICE

CERTIFICATE OF CORRECTION

Patent No. 3,676,304     James W. Hobbs et al     Dated: July 11, 1972

It is certified that error appears in the above-identified patent and that said Letters Patent are hereby corrected as shown below:

Column 4, line 13, "11signal" should read — 11th signal —;

Column 5, line 1, following "to" second occurrence, — said — should be added;

line 5, "and" should be — said —;

line 6, following "establish", — a — should be added.

Signed and sealed this 9th day of January 1973.

(SEAL)
Attest:

EDWARD M. FLETCHER, JR.          ROBERT GOTTSCHALK
Attesting Officer                 Commissioner of Patents